US005788312A

United States Patent [19]

Lee

[11] Patent Number: 5,788,312

[45] Date of Patent: Aug. 4, 1998

[54] SYSTEM AND METHOD FOR OPENING AND SHUTTING A TRUNK LID OF A VEHICLE

[75] Inventor: Jae-Il Lee, Ansan, Rep. of Korea

[73] Assignee: Hyundai Motor Company, Ltd., Seoul, Rep. of Korea

[21] Appl. No.: 671,270

[22] Filed: Jun. 26, 1996

[30] Foreign Application Priority Data

Jun. 26, 1995 [KR] Rep. of Korea ........................ 95-17702

[51] Int. Cl.$^{6}$ ........................ B62D 25/10

[52] U.S. Cl. ........................ 296/76; 49/280

[58] Field of Search ........................ 296/76; 49/280, 49/281

[56] References Cited

U.S. PATENT DOCUMENTS

| | | | |
|---|---|---|---|
| 2,737,254 | 3/1956 | Bayley | 296/76 |
| 2,999,683 | 9/1961 | Pickles | 296/76 |
| 3,343,303 | 9/1967 | Wanlass | 296/76 |
| 5,228,737 | 7/1993 | Zimmerman | 296/76 |

FOREIGN PATENT DOCUMENTS

| | | |
|---|---|---|
| 6-042259 | 2/1994 | Japan . |

*Primary Examiner*—Jesus D. Sotelo

[57] ABSTRACT

An opening and shutting system for a trunk lid of a vehicle, includes a switch for generating a first switch signal for opening the trunk lid and a second switch signal for shutting the trunk lid, a piston member connected to the trunk lid for moving the trunk lid, and a control mechanism for controlling a movement of the piston member according to the first and second switch signals so as to automatically open and shut the trunk lid of the vehicle.

19 Claims, 4 Drawing Sheets

SYSTEM AND METHOD FOR OPENING AND SHUTTING A TRUNK LID OF A VEHICLE

BACKGROUND OF THE INVENTION

1. Field of the Invention

The present invention relates to a system and method for automatically operating a trunk lid of a vehicle and more particularly, to a system and method for opening and shutting a trunk lid of a vehicle, whereby the driver of the vehicle can, without leaving the seat, selectively operate an up/down switch to automatically open and shut the trunk lid.

2. Description of Related Art

Various types of systems for opening and shutting a trunk lid of a vehicle are known in the art. Generally, as shown in FIG. 1, a trunk 10 of a vehicle 14 has a large space for storing items, e.g., baggages. The trunk 10 includes a trunk lid 11, a trunk hood 12 having a goose neck configuration, and a latch 13. The trunk hood 12 is connected to the interior of a front panel 15 of an auto body 18 by bolts (not shown) and to a torsion bar (not shown) fixed to the auto body 18 of the vehicle for the trunk lid 11 to open easily. The latch 13 attached to a tail portion of the trunk lid 11 is locked with a striker 16 fixed to a back panel 17 of the trunk 10 to maintain the trunk 10 in a locked position.

Referring to FIGS. 1 and 1A, in the conventional trunk systems, the driver operates a trunk lid opening switch 21 disposed inside the vehicle to open the trunk lid 11. That is, when the opening switch 21 is operated, a solenoid valve 20 connected to the opening switch 21 moves the latch 13 so that the latch 13 is released from the striker 16 and the biasing force of the torsion bar moves the trunk hood 12 outwardly. As a result, the trunk lid 11 is placed in an open position.

In order to shut the opened trunk lid 11, however, the driver has to leave his or her seat, get out of the vehicle, and manually press down the trunk lid 11, or someone else has to help the driver to shut the trunk lid 11. Therefore, it is difficult for a short person to shut the trunk lid since the trunk lid as opened is often in a higher position for some vehicles.

SUMMARY OF THE INVENTION

Accordingly, it is an object of the present invention to provide an opening and shutting system and method for a trunk lid of a vehicle, which eliminates the above problems encountered with conventional opening and shutting systems for a trunk lid of a vehicle.

Another object of the present invention is to provide a system and method for opening and shutting a trunk lid of a vehicle, which includes an up/down switch disposed near the driver on a driver's seat whereby the driver can selectively open and shut the trunk lid without leaving the driver's seat or any help from an outsider.

A further object of the present invention is to provide a system and method for automatically operating a trunk lid of a vehicle, which is simple in structure, inexpensive to manufacture, durable in use, and refined in appearance.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention in accordance with the embodiments of the present invention is directed to a system for opening and shutting a trunk lid of a vehicle, including switch means for generating first and second switch signals; moving means connected to the trunk lid for moving the trunk lid; and control means for controlling the moving means according to the first and second switch signals so as to automatically open and shut the trunk lid.

Furthermore, the present invention in accordance with the embodiments of the present invention includes a method of opening and shutting a trunk lid of a vehicle, including the steps of generating a first switch signal for opening the trunk lid and a second switch signal for shutting the trunk, and controlling a piston member connected to the trunk lid according to the first and second switch signals so as to automatically open and shut the trunk lid.

BRIEF DESCRIPTION OF THE DRAWINGS

The present invention will become more fully understood from the detailed -description given hereinbelow and the accompanying drawings which are given by way of illustration only, and thus, are not limitative of the present invention, and wherein.

DESCRIPTION OF THE PREFERRED EMBODIMENTS

Figure 1:
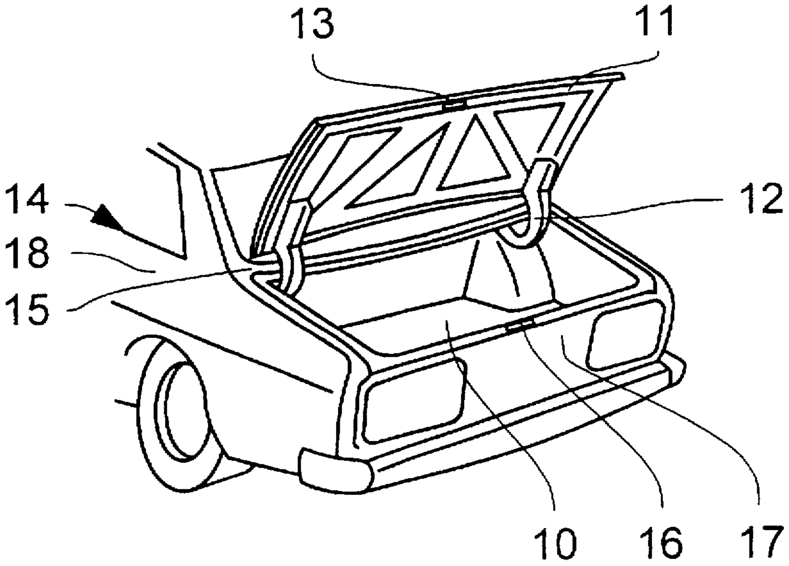
FIG. 1 CONVENTIONAL ART
FIG. 1 is a partial view of a conventional system for opening and shutting a trunk lid of a vehicle.
Figure 1A:
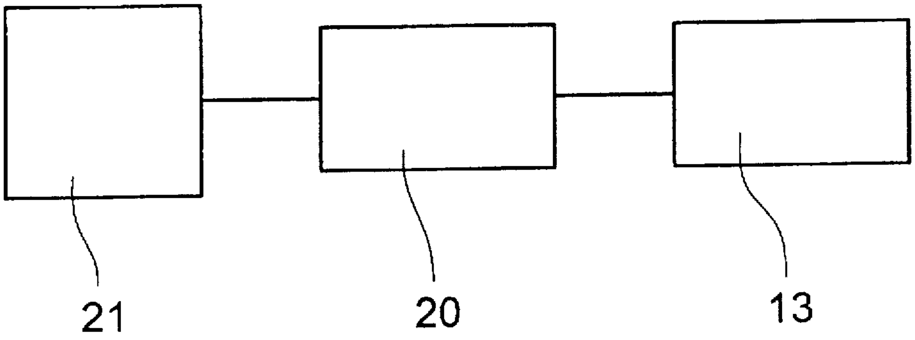
FIG. 1A CONVENTIONAL ART
FIG. 1A is a block diagram for explaining a conventional locking system for a trunk lid of a vehicle.
Figure 2:
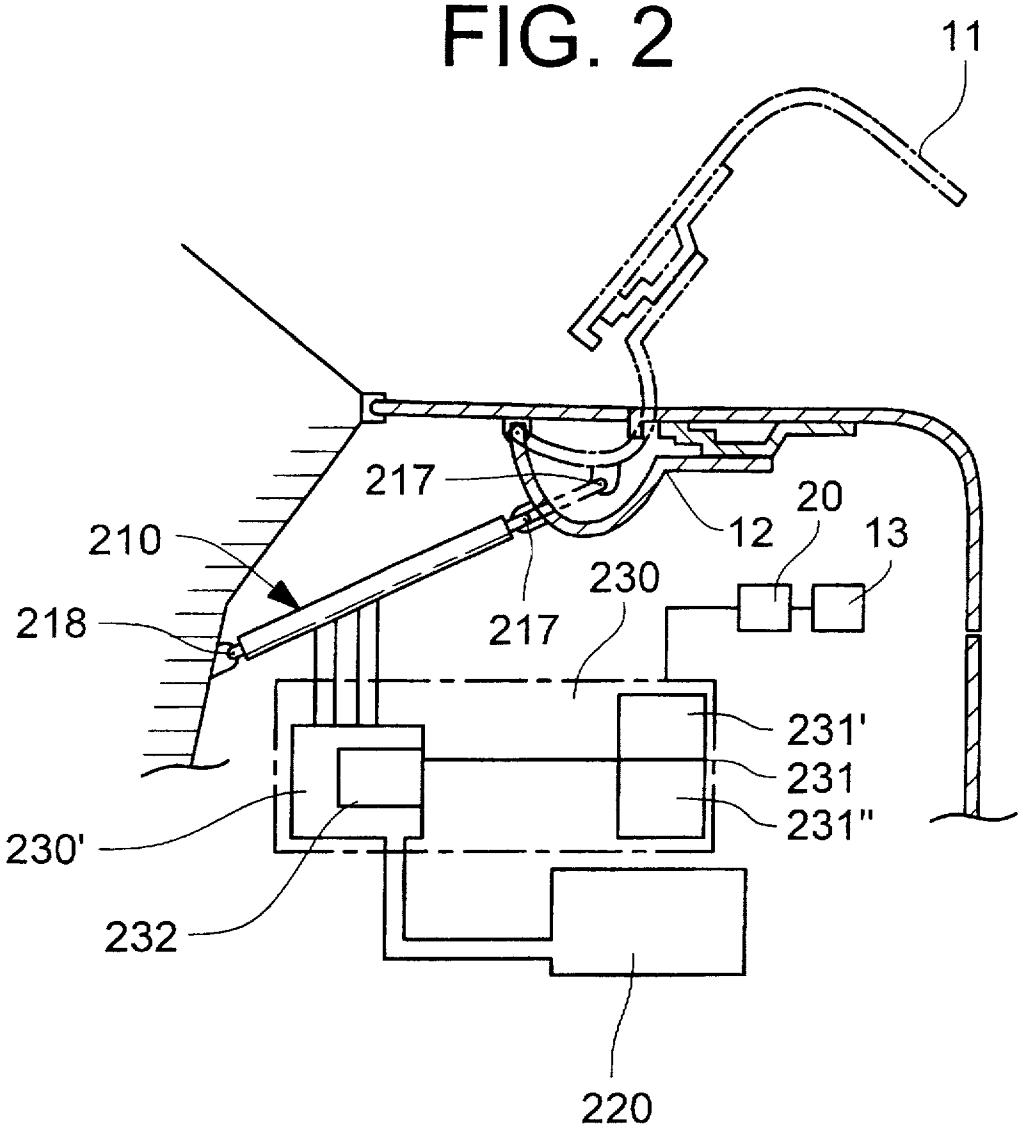
FIG. 2 is a partially sectional view of an opening and shutting system of a trunk lid of a vehicle according to the embodiments of the present invention.

Referring now in detail to the drawings for the purpose of illustrating preferred embodiments of the present invention, the opening and shutting system of a trunk lid of a vehicle, for example, as shown in FIG. 2, includes a trunk lid 11, a trunk hood 12 attached to the trunk lid 11, a piston member 210 movably connected to the trunk hood 12 at one end thereof through a first hinge 217 and to an auto body 18 at the other end thereof through a second hinge 218, an air compressor 220 for generating air pressure to the piston member 210, and a controlling unit 230.

The controlling unit 230 includes an up/down switch 231 disposed in a seat area of the driver, an operation member 230' disposed between the piston member 210 and the air compressor 220 and having a predetermined configuration for selectively controlling the air flow to and from the piston member 210, and a solenoid valve 232 for selecting a flow channel for the air supplied by the air compressor 220 according to the up/down switch 231.

The up/down switch 231 includes an up switch 231' for opening the trunk lid and a down switch 231" for closing the trunk lid. The up switch 231' is connected to a solenoid valve 20 and a latch 13 so that, when the up switch 231' is operated by the driver, the solenoid valve 20 moves the latch 13 to release it from a striker to open the trunk, similar to the conventional trunk locking system.

Figure 3:
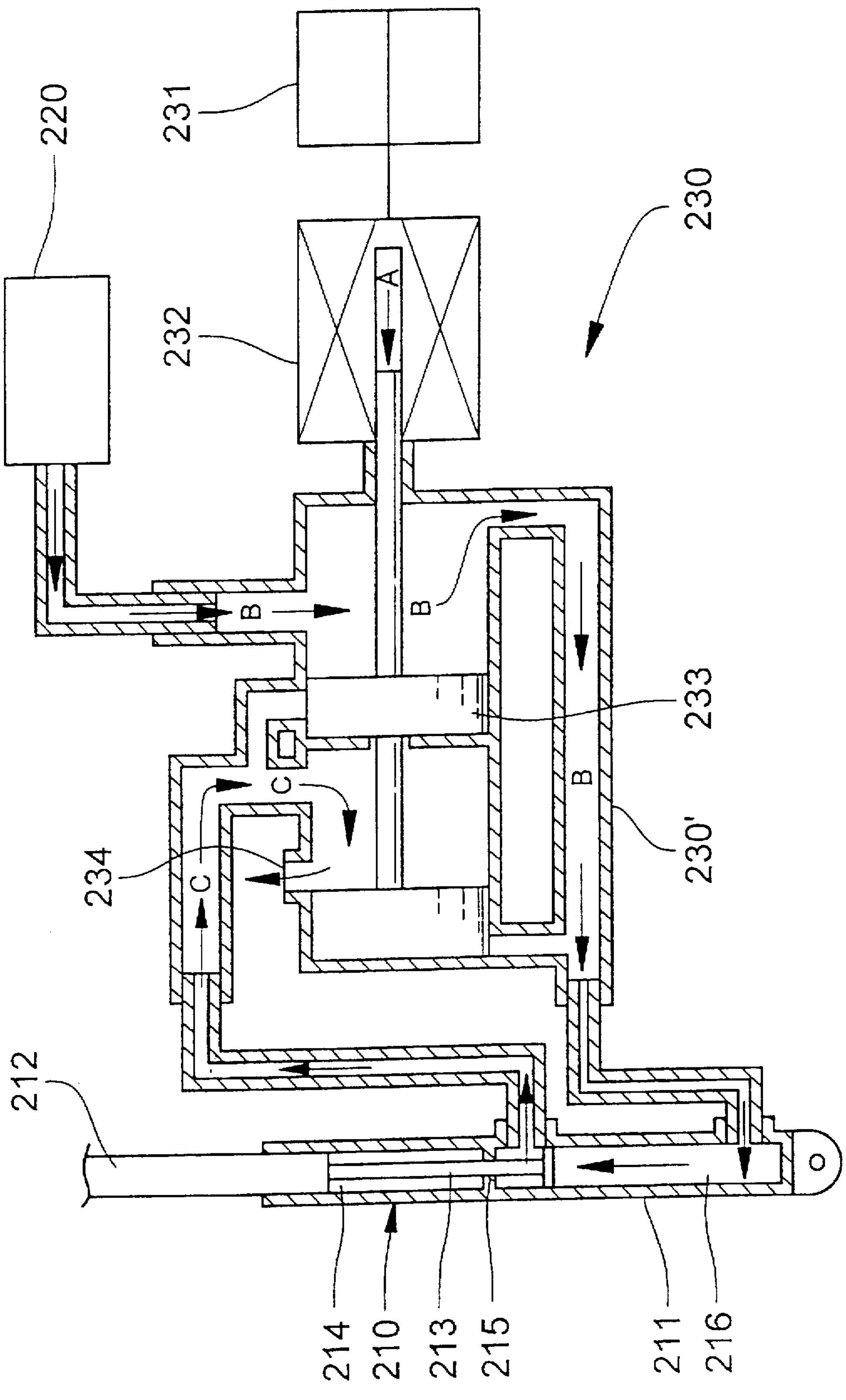
FIG. 3 is a partially sectional view of the opening and shutting system of the trunk lid of the vehicle in an open position according to the embodiments of the present invention.
Figure 4:
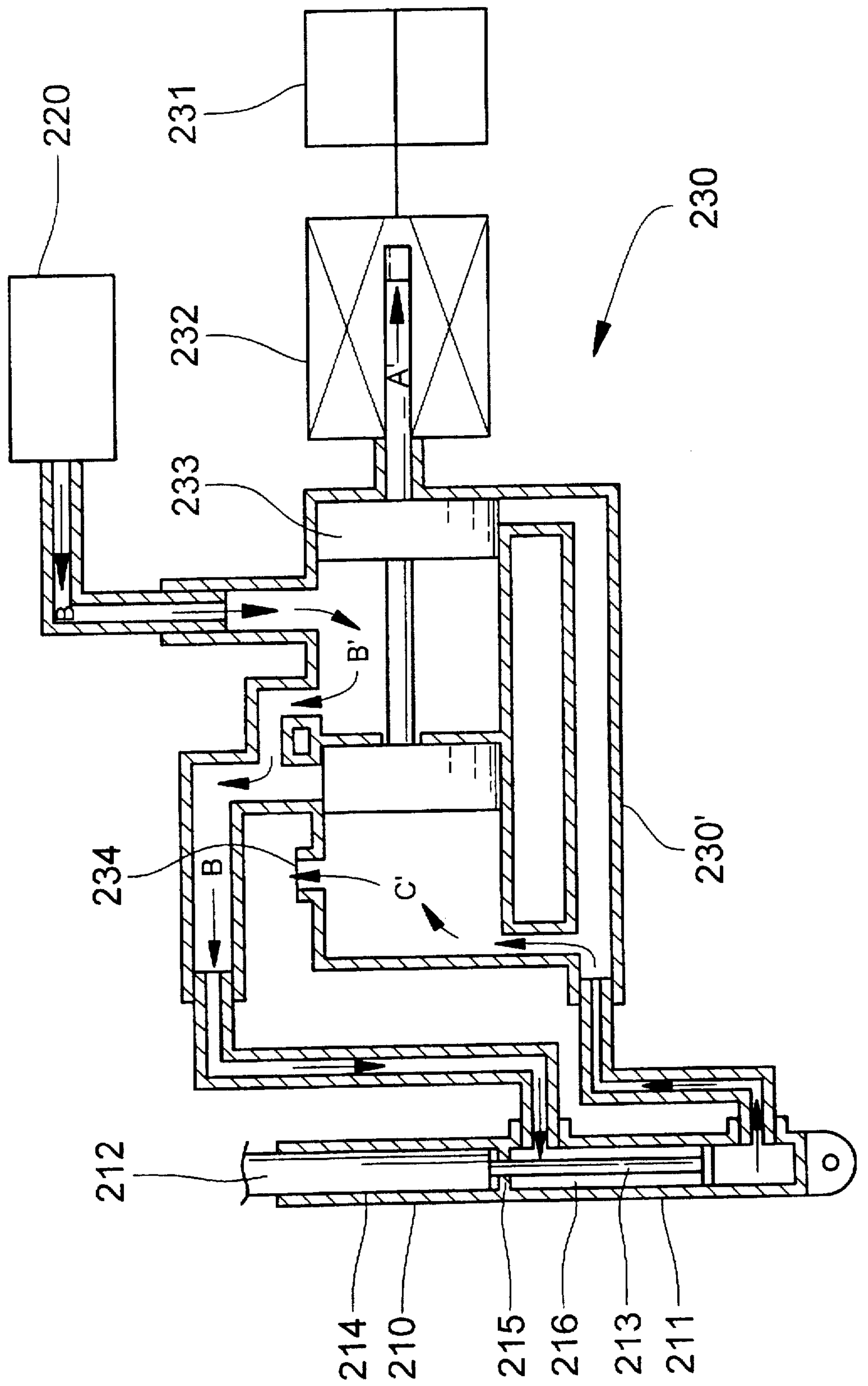
FIG. 4 is a partially sectional view of the opening and shutting system of the trunk lid of the vehicle in a closed position according to the embodiments of the present invention.

As shown in FIGS. 3 and 4, the piston member 210 includes a cylinder 211 containing a first chamber 214, a second chamber 216, and a partition 215 between the first and second chambers 214 and 216. The piston member 210 further includes a first piston 212 disposed within the first chamber 214 and a second piston 213 disposed within the second chamber 216. The first piston 212 is connected to the trunk hood 12 through the first hinge 217 (FIG. 2). The solenoid valve 232 is of an electromagnetic type and has a three-way valve 233, thereby changing the flow channel of the air generated from the air compressor 220.

The opening and shutting system of a trunk lid for a vehicle according to the embodiments of the present invention operates as follows. First of all, as shown in FIG. 3, in order to open the trunk lid 11, the user operates the up switch 231'. This activates simultaneously both the solenoid valves 20 and 232. As activated, the solenoid valve 20 moves the latch 13 to unlock the trunk lid 11, whereas the solenoid valve 232 moves the three-way valve 233 to the left direction as indicated by arrow (A) in FIG. 3. Due to this movement, the three-way valve 233 blocks an upper path way and allows the compressed air from the air compressor 220 to flow through a first air channel in the direction as indicated by arrow (B) to a lower part of the second chamber 216 of the cylinder 211. Therefore, the first and second pistons 212 and 213 as a composite structure moves up and pushes up the trunk hood 12 connected to the first piston 212, so that the trunk lid 11 is in an open position as shown in the dotted line of FIG. 2. At that time, the air in the second chamber 216 flows out through a one-way valve 234 in the direction as indicated by arrow (C) in FIG. 3.

On the other hand, as shown in FIG. 4, in order to close the opened trunk lid 11, the user operates the down switch 231". This activates the solenoid valve 232 which moves the three-way valve 233 to the right as indicated by arrow (A') so that the compressed air from the air compressor 220 flows through a second flow channel to an upper part of the second chamber 216 in the direction as indicated by arrow (B'). This moves down the first and second pistons 212 and 213 as a composite structure and brings down the trunk hood 12 connected to the first piston 212 so that the trunk lid 11 is placed in a closed position, as shown in FIG. 2. When the trunk lid 11 is in the closed position, the latch 13 ia automatically locked with a striker due to the downward force of the trunk lid 11. At this time, the air in the second chamber 216 flows out through the one-way valve 234 in the direction as indicated by arrow (C') in FIG. 4.

Accordingly, the opening and shutting system of a trunk according to the embodiments of the present invention has a number of advantages, e.g., the driver can open and shut the trunk lid merely by operating a switch without ever leaving the seat, the system is simple in structure, inexpensive to manufacture, and durable in use.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for opening and shutting a trunk lid of a vehicle, comprising:

switch means for generating first and second switch signals;

moving means connected to the trunk lid for moving the trunk lid; and control means for controlling the moving means according to the first and second switch signals so as to automatically open and shut the trunk lid, wherein the moving means includes, a second solenoid valve connected to the switch means for selecting a flow path of an air supplied to the control means, and a three-way valve being movable by an activation of the second solenoid valve so as to control a flow of the air according to the selected flow path.

2. A system of claim 1, wherein the switch means includes:

an up switch for generating the first switch signal for opening the trunk lid, and a down switch for generating the second switch signal for shutting the trunk lid.

3. A system of claim 2, wherein the first switch signal activates a first solenoid valve to release a latch attached to the trunk lid for unlocking the trunk lid.

4. A system of claim 1, wherein the moving means further includes:

an operation member having the three-way valve and connected to the second solenoid valve for controlling a flow of the air according to the selection, and a piston member for receiving the air from the operation member to move the trunk lid.

5. A system of claim 4, wherein the piston member includes:

first and second channels for the air to flow to and from the operation member, and a piston being movable within a cylinder according to the flow of the air to and from the operation member.

6. A system of claim 5, wherein the operation member includes:

a plurality of openings for flowing the air, two of which are connected to the first and second channels of the piston member and one of which is for outputting the air from the piston member.

7. A system of claim 4, wherein the operation member includes:

a first flow path for directing the air to a first portion of the piston member in response to the first switch signal generated by the switch means, and a second flow path for directing the air to a second portion of the piston member in response to the second switch signal generated by the switch means.

8. A system of claim 4, wherein when the switch means generates the first switch signal, the first switch signal is substantially simultaneously applied to a first solenoid valve for unlocking the trunk lid and to the second solenoid valve for moving a piston of the piston member upwardly to open the trunk lid.

9. A system of claim 4, wherein when the switch means generates the second switch signal, the second switch signal is applied to the second solenoid valve to move a piston of the piston member downwardly so as to automatically close and lock the trunk lid.

10. A system of claim 1, further comprising:

an air compressor for supplying the air to the control means.

11. A method of opening and shutting a trunk lid of a vehicle, comprising the steps of:

generating a first switch signal for opening the trunk lid and a second signal for shutting the trunk lid; and controlling a piston member connected to the trunk lid according to the first and second switch signals so as to automatically open and shut the trunk lid, wherein the controlling step includes the step of, providing an operation member having a movable three-way valve and connected to the piston member for setting an air flow path so as to control piston movement of the piston member.

12. A method of claim 11, further comprising the step of:

providing an air compressor to supply air to the piston member.

13. A method of claim 11, wherein the controlling step includes the step of:

activating a first solenoid valve in response to the first switch signal to unlock the trunk lid.

14. A method of claim 11, wherein the controlling step includes the steps of:

activating a second solenoid valve in response to the first and second switch signals, setting a direction of an air flow within an operation member by the activation of the second solenoid valve, and moving a piston of the piston member according to the direction of the air flow set.

15. A method of claim 14, wherein the operation member having the three-way valve is movable activation of the second solenoid valve to control the air flow within the operation member.

16. A method of claim 14, wherein when the first switch signal is generated, the controlling step includes the step of:

substantially simultaneously applying the first switch signal to a first solenoid valve for unlocking the trunk lid and to the second solenoid valve to move the piston upwardly.

17. A method of claim 14, wherein when the second switch signal is generated, the controlling step includes the step of:

applying the second switch signal to the second solenoid valve to move the piston downwardly, and automatically locking the trunk lid.

18. A method of claim 11, further comprising the step of:

providing a first flow path for directing an air to a first portion of the piston member in response to the first switch signal, and providing a second flow path for directing the air to a second portion of the piston member in response to the second switch signal.

19. A system for controlling a trunk lid of a vehicle, comprising:

switching means for generating first and second switch signals;

moving means connected to the trunk lid for moving the trunk lid; and control means for controlling the moving means according to the first and second switch signals, wherein the moving means includes a solenoid valve connected to the switch means for selecting a flow path of an air supplied to the control means, an operation member connected to the solenoid valve for controlling a flow of the air according to the selected flow path, and a piston member for receiving the air from the operation member, wherein the piston member includes first and second channels for the air to flow to and from the operation member, and a piston being movable within a cylinder according to the flow of the air to and from the operation member, and wherein the operation member includes a plurality of openings, two of which are connected to the first and second channels of the piston member and one of which is for outputting the air from the piston member.

* * * * *